United States Patent [19]
Taylor

[11] Patent Number: 6,135,134
[45] Date of Patent: Oct. 24, 2000

[54] EXCESS FLOW VOLUME CONTROL VALVE

[76] Inventor: Julian S. Taylor, 8300 SW. 8th St., Oklahoma City, Okla. 73128

[21] Appl. No.: 09/444,260

[22] Filed: Nov. 22, 1999

[51] Int. Cl.$^7$ ..................................................... F16K 17/40
[52] U.S. Cl. ........................ 137/68.11; 137/71; 137/460
[58] Field of Search .................................. 137/68.11, 71, 137/460, 461

[56] References Cited

U.S. PATENT DOCUMENTS

| | | | |
|---|---|---|---|
| 4,727,903 | 3/1988 | Sturgis et al. | 137/461 |
| 5,318,060 | 6/1994 | Taylor | 137/67 |
| 5,373,864 | 12/1994 | Taylor | 137/67 |
| 5,685,329 | 11/1997 | Taylor | 137/71 |
| 5,706,848 | 1/1998 | Taylor | 137/71 |
| 5,727,586 | 3/1998 | Taylor | 137/68.11 |

*Primary Examiner*—Gregory L. Huson
*Assistant Examiner*—Ramesh Krishnamurthy
*Attorney, Agent, or Firm*—Robert K. Rhea

[57] ABSTRACT

A shutoff valve assembly interposed in a fluid line for monitoring fluid flow volume and closing a fluid conductor, in the event of fluid flow volume above a predetermined value. The valve assembly contains a valve seat and a normally open piston valve for sealing with the seat and includes opposing piston rods each slidably supported at one end portion by end caps. The piston valve is normally fluid pressure balanced by equal upstream and downstream rod end surface areas. A plate is secured to the body by posts in axial spaced relation with respect to the downstream end portion of one piston rod for supporting a pressure collapsible rod-like pin in accordance with Euler's law for slender columns, axially interposed between the plate and the adjacent piston valve rod.

6 Claims, 2 Drawing Sheets

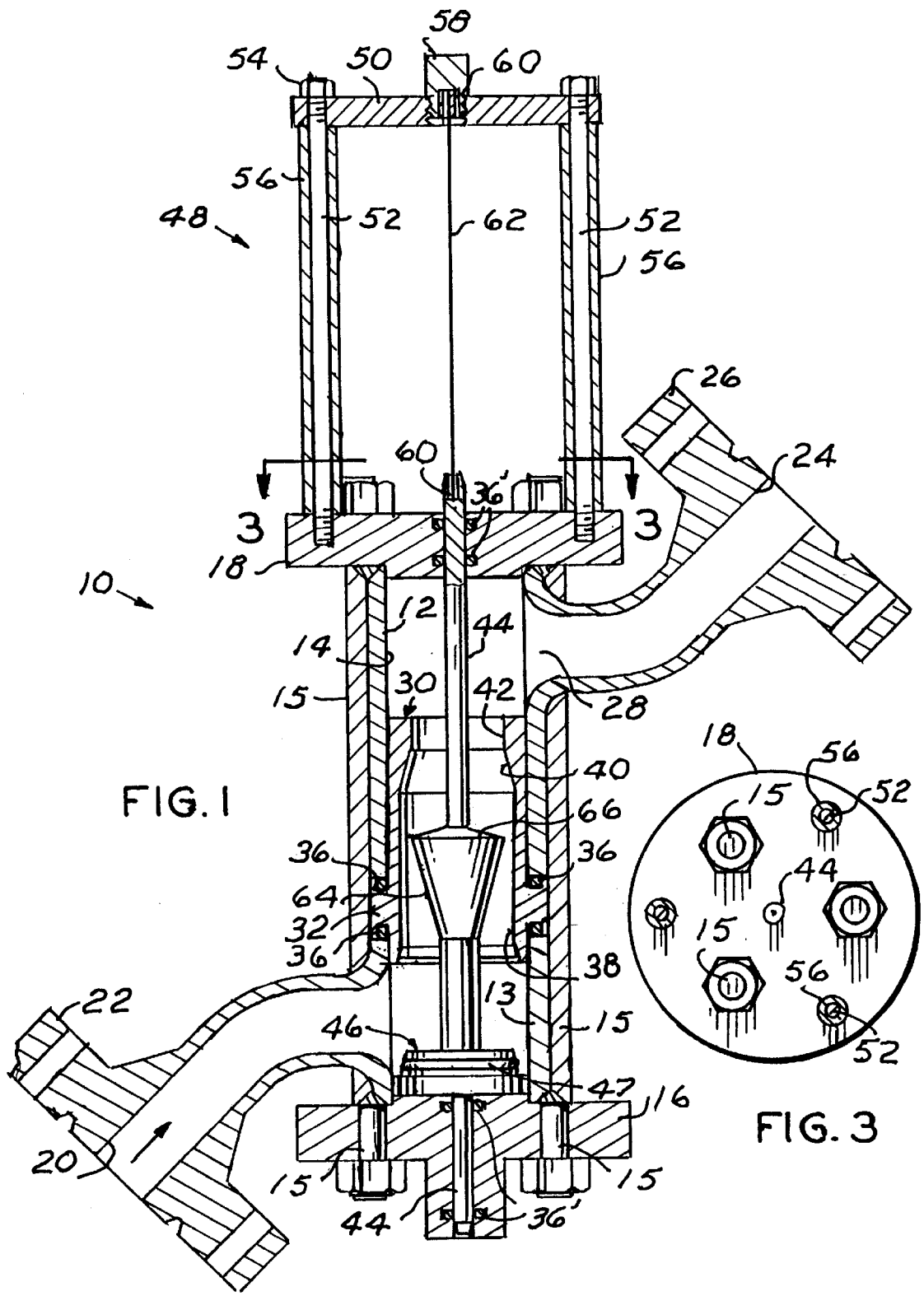

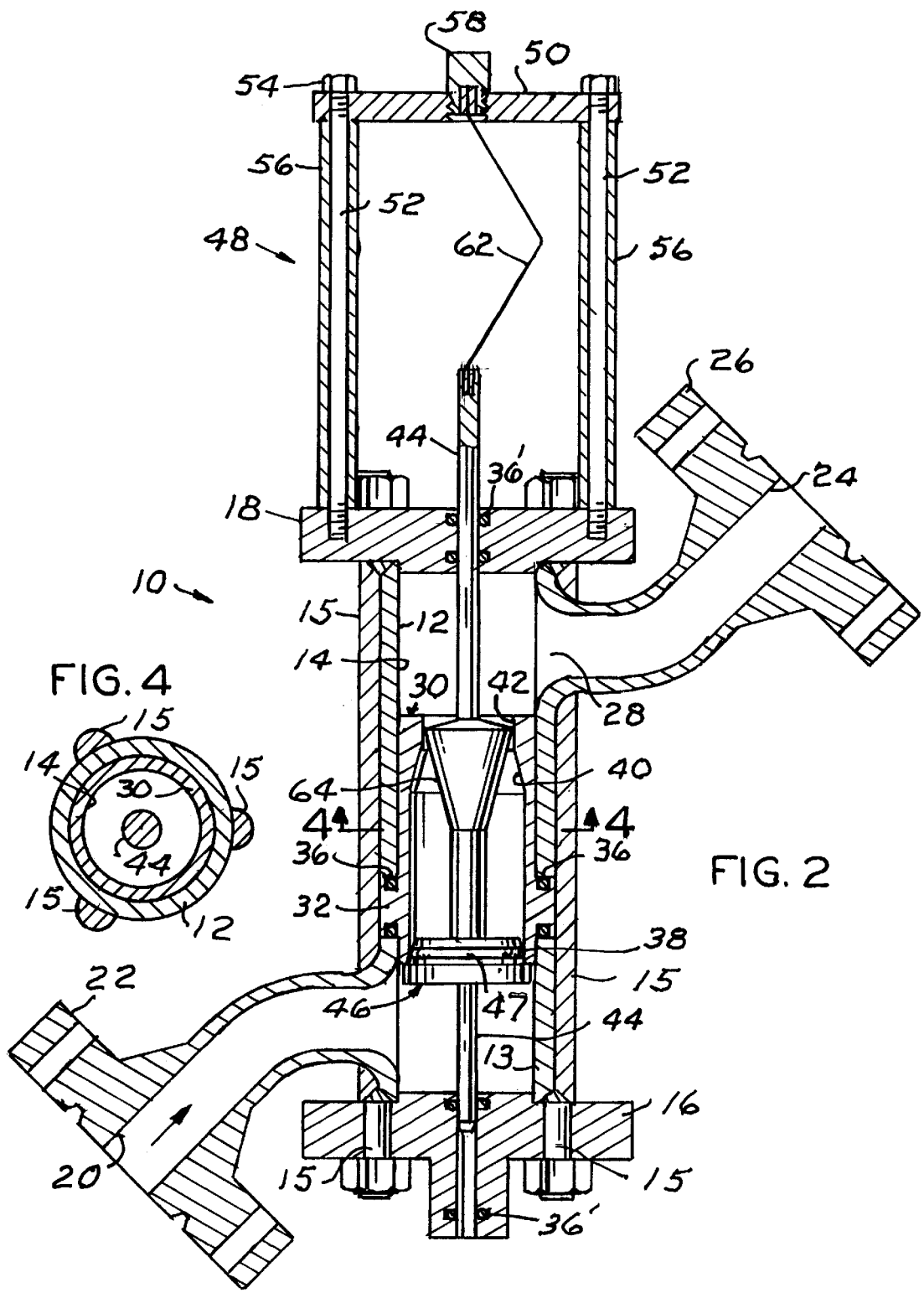

EXCESS FLOW VOLUME CONTROL VALVE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to relief valves and more particularly to an excess flow volume control shut off valve.

1. Field of the Invention

The flow volume of a fluid through conductors is preferably maintained at or near the limit of flow compacity of the conductors or vessels to which the fluid is being injected. Sometimes the downstream conductor or vessel breaks resulting in the loss of fluid through the hole in the conductor or vessel. There is a need for stopping the volume of flow in case of a brake in the flow line or vessel. This invention solves this problem.

2. Description of the Prior Art

U.S. Pat. No. 5,318,060, issued Jun. 7, 1994, to Taylor for, "FLUID FLOW VELOCITY EMERGENCY SHUTOFF VALVE", and U.S. Pat. No. 5,373,864, issued Dec. 20, 1994, to Taylor for, "DOWN STREAM LOW FLUID PRESSURE EMERGENCY SHUTOFF VALVE" are believed good examples of the state-of-the-art U.S. Pat. No. 5,318,060, features control of flow velocity impinging on a valve disk in a the flow line and when the fluid velocity reaches a predetermined limit it moves the valve rod longitudinally to seat the disk valve and stop fluid flow through the valve. The other U.S. Pat. No. 5,373,864, features a similar disk valve in a flow passageway which is maintained off seat by a spring during under normal fluid flow impinging on the disk valve, but releases the spring to close the disk valve with its seat in the event fluid pressure in the flow passageway falls below a predetermined minimum.

This invention is believed distinctive over both of these similar patents, by providing a relief valve which features a conically shaped member axially moveable longitudinally in a fluid flow passageway. When the fluid volume across the conical member generates a predetermined pressure drop, across the position of the conical member fluid bypass, a piston valve moves longitudinally downstream and collapses a slender column normally maintaining the piston valve in fluid flow position.

BRIEF SUMMARY OF THE INVENTION

An elongated valve assembly is closed at respective ends by axially apertured end plates and is provided with a valve seat intermediate its ends. Axially aligned lateral inlet and outlet ports communicate with a fluid passageway through the valve assembly on opposite sides of the valve seat and are provided with bolt flange ends to be interposed in a fluid flow line, not shown. A piston valve has opposite end piston rods slidable through the end plates. The rod end surfaces are exposed to atmospheric pressure. A piston valve and stop on one of the piston rods is normally maintained off seat by a slender column cage assembly at the opposite end of the valve assembly, normally preventing longitudinal movement of the piston valve toward its seat. Upstream from the piston valve seat the piston rod is provided with an enlarged inverted truncated conical wall member diverging in a downstream direction, allowing a predetermined volume of flow through the fluid passageway. An excess volume of flow impinging on the conical member wall biases the piston valve and its rods toward the collapsible pin to seal the piston valve with the seat and close the fluid passageway.

The principal object of this invention is to provide a shut-off valve which monitors fluid flow volume and interrupts the flow in the event the fluid flow volume increases above a predetermined value.

BRIEF DESCRIPTION OF THE SEVERAL VIEWS OF THE DRAWINGS

FIG. 1 is a longitudinal cross-sectional view through the valve in open position;

FIG. 2 is a longitudinal cross-sectional view similar to FIG. 1, with the valve in fluid closed position;

FIG. 3 is a horizontal cross section, to a smaller scale, taken substantially along the line 3—3 FIG. 1; and FIG. 4 is a horizontal cross section taken substantially along the line 4—4 of FIG. 2.

DETAILED DESCRIPTION OF THE INVENTION

Like characters of reference designate like parts in those figures of the drawings in which they occur.

In the Drawings:

The reference numeral 10 indicates an elongated tubular valve, formed by axial sleeves 12 and 13, respectively, held in axial aligned relation by multiple bolts 15 having end nuts defining a cylindrical inner surface 14 closed at respective ends by end caps 16 and 18, each having a central aperture. The valve 10 is provided with a lateral inlet port 20 at one end portion surrounded by a bolt flange 22 and an opposite outlet port 24, laterally of the other end portion of the valve similarly surrounded by a bolt flange 26. The axes of the inlet and outlet ports 20 and 24 are axially aligned so that the valve 10 may be interposed in a fluid conductor, not shown, and form a fluid passageway 28 through the valve. An open end tube 30 having a peripheral flange 32 adjacent one end is axially interposed between the confronting ends of the sleeves 12 and 13 and sealed fluid tight by a pair of O-rings 36. The upstream end portion of the tube 30, adjacent the inlet port 20, forms a valve seat 38 and the other or down-stream end portion of the tube 30 forms a passageway constriction by its inter wall converging in a downstream direction, as at 40, terminating in a cylindrical wall portion 42, at the downstream limit of the tube.

An elongated piston slidably projects at its respective rod end portions 44 through the central bore of the end caps 16 and 18, and is sealed therewith by other O-rings 36'. A piston valve 46 having a surrounding O-ring 47, is axially secured to the upstream end portion of the rod 44, adjacent the inlet port 20 and is normally maintained off seat (FIG. 1), by a pin cage means 48.

The cage pin means 48 comprises an end plate 50, maintained in parallel spaced relation with respect to the valve body end cap 18, by a plurality of circumferential and radially spaced posts 56 threadedly connected at one end portion with the end cap 18, and projecting through the end plate 50 and secured at the other end portion by nuts 54. A plurality of spacers 56 respectively surround the posts 52, for the purpose of maintaining the end plate 50 in fixed position with respect to the end cap 18. The end plate 50 is centrally bored and threaded for receiving a pin nut 58 having a diametrically reduced and threaded end.

The confronting ends of the pin nut 58 and the downstream end portion of the piston rod 44 are coaxially drilled for receiving pin bushings 60 nesting the respective end portions of a collapsible pin 62.

The piston rod 44 is further provided with a downstream fluid constriction comprising a downstream diverging wall portion 64, of inverted truncated conical shape which terminates in a downstream terminal diameter and end surface 66 closely received by the sleeve cylindrical inner wall 42 when the piston valve O-ring 47 is sealed with the seat 38.

OPERATION

Assuming the valve assembly is in the position of FIG. 1 and a predetermined volume of fluid is flowing through the passageway 28. In the event the flow volume increases to a predetermined rate above a predetermined value it generates a pressure differential across the position of the conical wall shaped member 64 and downstream end portion of the flow passageway which results in the conical shaped member moving the piston rods toward the cage means 48 collapsing the pin 62 and positioning the perimeter of the conical member 66, adjacent the cylindrical wall 42 which interrupts fluid flow and seals the piston ring 47 with the seat 38 to interrupt fluid flow through the passageway.

Obviously the invention is susceptible to changes or alterations without defeating its practicability. Therefore, I do not wish to be confined to the preferred embodiment(s) shown in the drawing(s) and described herein.

I claim:

1. A fluid flow volume control valve, comprising:

a valve assembly including a valve body having an inlet port and an outlet port forming a fluid passageway interposed in a flow line;

tubular means having a downstream converging inner peripheral surface and having a valve seat interposed in the passageway;

normally open piston valve means including a piston valve for sealing with said valve seat and closing the fluid passageway and having axially opposite valve stems on the piston valve and atmosphere exposed upstream and downstream equal end surface areas slidably supported by said valve assembly;

axially collapsible pin means for normally biasing said valve means toward a fluid passageway open position and releasing said valve means for sealing with said valve seat in response to a predetermined fluid flow volume; and, means for sealing said piston valve with said valve seat, said piston valve means further having an inverted truncated conical portion having a downstream terminal diameter slidably received by the inner periphery of the downstream end portion of the inner converging surface.

2. The control valve according to claim 1 in which said pin means comprises:

pin cage means including a plate secured to said valve body in axial outstanding relation with respect to the outwardly projecting end portion of one said valve stem; and, an elongated rod-like pin axially extending between said one valve stem end portion and said plate.

3. The control valve according to claim 2 in which said pin cage means further includes:

a plurality of post means surrounding said pin in radially spaced relation for connecting said plate with said valve assembly.

4. A fluid flow volume control valve, comprising:

a valve assembly including a valve body having an inlet port and an outlet port forming a fluid passageway interposed in a flow line;

tubular means having a valve seat interposed in the passageway and having a downstream converging inner peripheral surface;

normally open piston valve means having atmosphere exposed upstream and downstream equal end surface areas and slidably supported by said valve assembly laterally of the passageway for movement toward said valve seat and closing the fluid passageway, said valve means comprising:

a piston valve for sealing with valve said seat;

an inverted truncated conical wall portion having a downstream terminal diameter slidably received by the inner periphery of the downstream limit of said tubular means inner converging surface; and, axially collapsible pin means for normally biasing said valve means toward a fluid passageway open position and releasing said piston valve means for sealing with said valve seat in response to a predetermined volume of fluid flow.

5. The control valve according to claim 4 in which said pin means comprises:

pin cage means including a plate secured to said valve body in axial outstanding relation with respect to the downstream end portion of one said valve stem; and, an elongated rod-like pin axially extending between said one valve stem downstream end portion and said plate.

6. The control valve according to claim 5 in which said pin cage means further includes:

a plurality of post means surrounding said pin in radially spaced relation for connecting said plate with said valve body.

* * * * *